United States Patent
Lin et al.

(10) Patent No.: US 8,260,037 B2
(45) Date of Patent: Sep. 4, 2012

(54) 3D MODEL RECONSTRUCTION ACQUISITION BASED ON IMAGES OF INCREMENTAL OR DECREMENTAL LIQUID LEVEL

(75) Inventors: Huei-Yung Lin, Chia-Yi (TW);
Min-Liang Wang, Chia-Yi (TW);
Sung-Chun Liang, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 897 days.

(21) Appl. No.: 12/320,231

(22) Filed: Jan. 22, 2009

(65) Prior Publication Data

US 2010/0008566 A1 Jan. 14, 2010

(30) Foreign Application Priority Data

Jul. 10, 2008 (TW) ................................ 97126194 A

(51) Int. Cl.
*G06K 9/00* (2006.01)

(52) U.S. Cl. ...................................... 382/154; 382/100

(58) Field of Classification Search .................. 382/103, 382/154
See application file for complete search history.

(56) References Cited

U.S. PATENT DOCUMENTS

| 5,903,663 A * | 5/1999 | Abend ........................... 382/152 |
| 6,098,029 A * | 8/2000 | Takagi et al. .................. 702/127 |
| 7,164,424 B2 * | 1/2007 | Liang et al. ................... 345/473 |

FOREIGN PATENT DOCUMENTS

| TW | 381008 | 2/2000 |
| TW | 555114 | 9/2003 |

OTHER PUBLICATIONS

Yamashita, 3-D Measurement of Objects in a Cylindrical Glass Water tank with a Laser Range Finder, IEEE, 2003.*
Martinez-Solanno, Modeling flow and concentration field in rectangular water tanks.*

* cited by examiner

Primary Examiner — Alex Liew
(74) Attorney, Agent, or Firm — Bacon & Thomas, PLLC

(57) ABSTRACT

A 3D model reconstruction acquisition includes the steps of preparing a transparent container and at least one image capture device, wherein an object is placed in the transparent container and a liquid is received in the transparent container; keeping the liquid level rising or lowering to allow the liquid level to pass through a surface of the object and then keeping capturing a series of the images; computing a liquid-level equation for each of the images by using curves of the images between the object and the incremental or decremental liquid level confined by the transparent container; computing 3D coordinates of the curves in accordance with the liquid-level equation of each image; and collecting 3D coordinates of all of the curves to create a 3D model of the object. In addition, the acquisition can be done in the environment having water and thus be applied to various environments.

5 Claims, 6 Drawing Sheets

3D MODEL RECONSTRUCTION ACQUISITION BASED ON IMAGES OF INCREMENTAL OR DECREMENTAL LIQUID LEVEL

BACKGROUND OF THE INVENTION

1. Field of the Invention

The present invention relates generally to 3D model reconstruction acquisition, and more particularly, to a 3D model reconstruction acquisition based on images of incremental or decremental liquid level.

2. Description of the Related Art

As regards the conventional 3D model reconstruction acquisition, for example, Taiwan Patent Pub. No. 381008 disclosed a localization apparatus and an orientation calibration approach, by which 2D scanned images are reconstructed to become 3D images and the images of three orthogonal and random sections, at which end points of an operating instrument are located.

In addition, Taiwan Patent Pub. No. 555114 disclosed a 3D image reconstruction module, in which the captured image data is rapidly reconstructed by the 3D image processing frame and digital signal processing frame of data flow control constituted by the pipe-type parallel processing architecture to become 3D image data.

Further, a common 3D coordinate measuring machine, like the contact-type 3D coordinate measuring machine produced by Sheffield Measurement or the noncontact-type 3D coordinate measuring machine produced by Mycrona Measurement System, can measure the 3D model of an object. However, the aforesaid 3D coordinate measuring machines are too expensive to be afforded by the general small research organizations or factories. Besides, the machines are large and less mobile to have limitations in operation.

SUMMARY OF THE INVENTION

The primary objective of the present invention is to provide a 3D model reconstruction acquisition, which captures a series of images of incremental or decremental liquid level to compute a 3D model of an object and can be done in the environment having water and thus be applied to various environments.

The foregoing objective of the present invention is attained by the 3D model reconstruction acquisition including the steps of preparing a transparent container and at least one image capture device, wherein the image capture device is spaced from the transparent container, the transparent container is shaped like a hollow cylinder and has a geometric cross-section, an object is placed in the transparent container, and a liquid is received in the transparent container; keeping the liquid level rising or lowering to allow the liquid level to pass through a surface of the object and then keeping capturing an image of the liquid level every predetermined duration by the image capture device to capture a series of the images; computing a liquid-level equation for each of the images by using curves of the images between the object and the incremental or decremental liquid level confined by the transparent container; computing 3D coordinates of the curves in accordance with the liquid-level equation of each image; and collecting 3D coordinates of all of the curves to create a 3D model of the object.

DETAILED DESCRIPTION OF PREFERRED EMBODIMENTS

Figure 1:
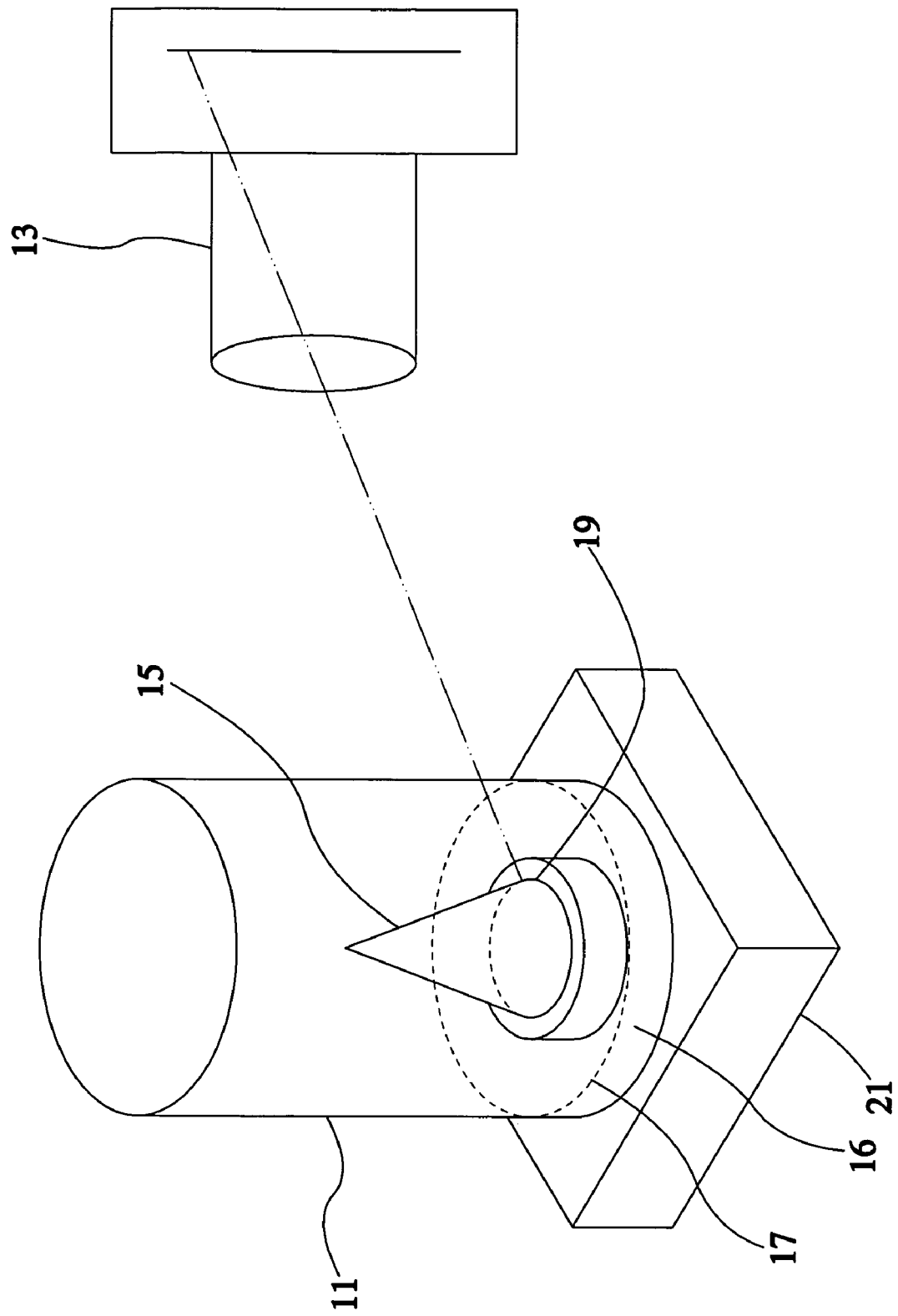
FIG. 1 is a schematic view of an allocation in accordance with a first preferred embodiment of the present invention.
Figure 2:
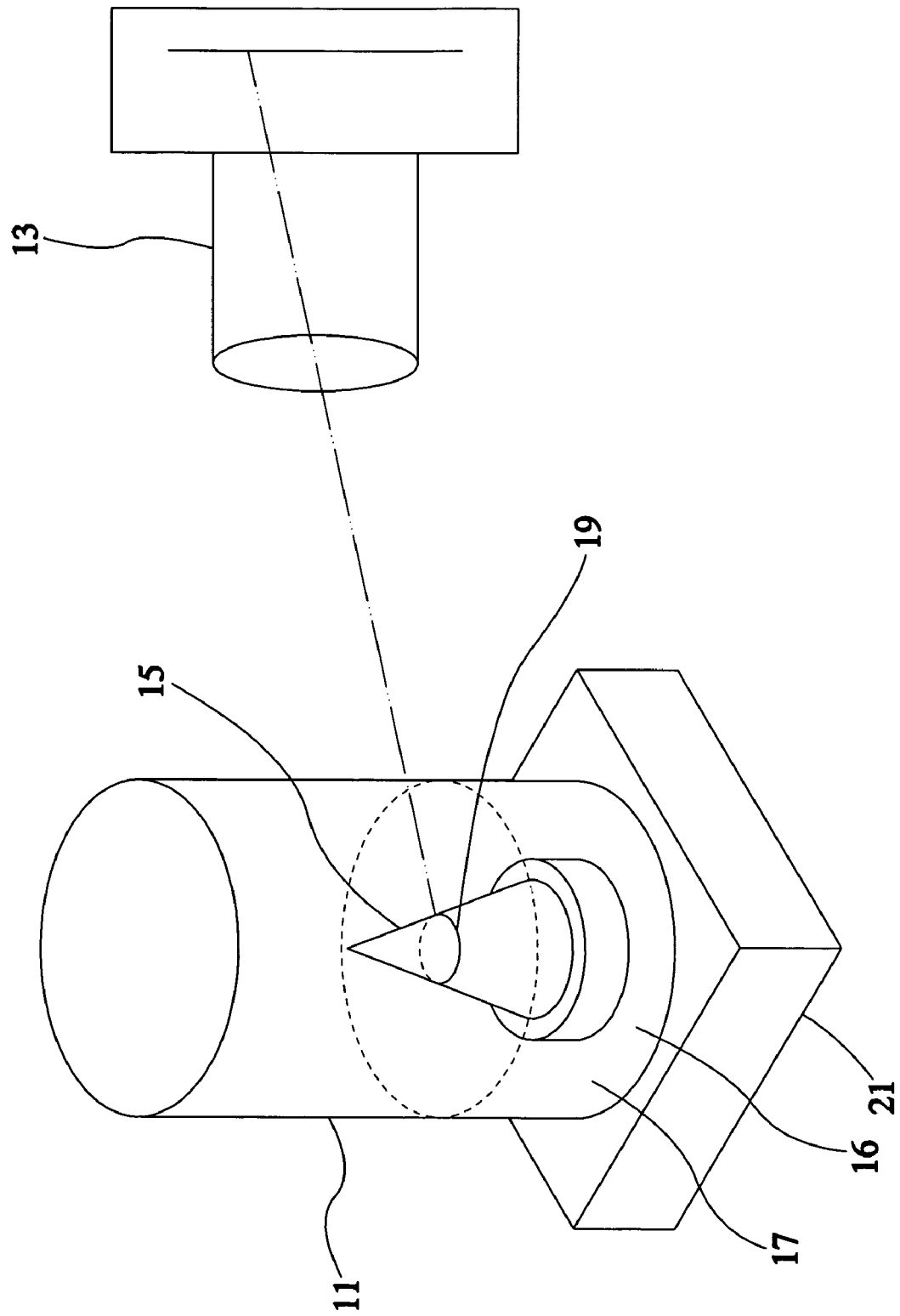
FIG. 2 is a schematic view of the preferred embodiment of the first present invention in operation, illustrating the liquid level rises.
Figure 3:
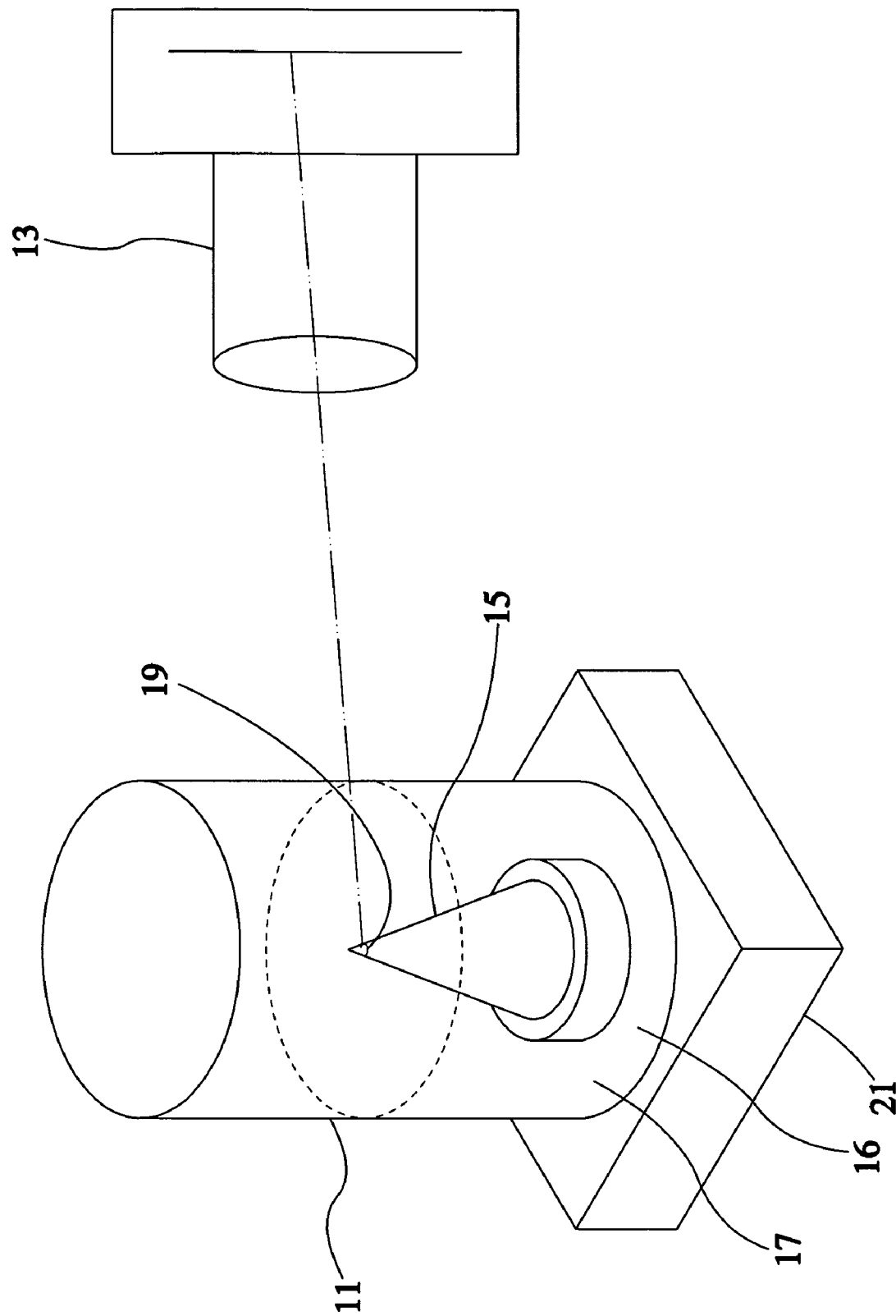
FIG. 3 is another schematic view of the preferred embodiment of the first present invention in operation, illustrating the liquid level is higher than that of FIG. 2.

Referring to FIG. 1, a 3D model reconstruction acquisition based on images of incremental or decremental liquid level in accordance with a first preferred embodiment of the present invention includes the following steps.

a) Prepare a transparent container 11 and an image capture device 13. The transparent container 11 is cylindrical, having a cross-section of predetermined geometric figure. In this embodiment, the cross-section of transparent container 11 is circular; an object 15 is placed in the transparent container 11; a liquid 16 is received in the transparent container 11; and the image capture device 13 is a camera spaced from the transparent container 11 for a predetermined interval and is higher than the object 15, for capturing images of the object 15 and the liquid 16, wherein the camera is relatively lower than the object 15.

b) As shown in FIGS. 1-3, keep the liquid level 17 of the liquid 16 rising or lowering to enable the liquid level 17 to pass through the surface of the object 15, and then keep capturing images of the liquid level 17 by the image capture device 13 every predetermined duration so as to capture a series of multiple images.

c) Compute a liquid-level equation for each of the images by using the images and the shape of liquid level 17 confined by the transparent container 11.

d) Compute 3D coordinates of all of curves 19 between the images and the incremental or decremental liquid level in accordance with the liquid-level equations of the images. The curves 19 shown in FIGS. 1-3 are what the object 15 substantially contacts the liquid level 17 not those in the images. Because the curves 19 in the images are provided for calculation only and do not need any drawing for illustration, the curves 19 are not shown in the drawings.

e) Collect 3D coordinates of all of the curves 19 to create a 3D model of the object 15.

In light of the above steps, the 3D model of the object 15 facing the image capture device 13 is created. In the above steps, the liquid-level equation for each image is inferred from the steps mentioned below.

An ellipsoid equation of an image plane 33 is defined as follows: $ax^2+bxy+cy^2+dx+ey+f=P^TCP=0$, wherein $$P = [X \ Y \ Z]^T, \quad C = \begin{bmatrix} a & \frac{b}{2} & \frac{d}{2} \\ \frac{b}{2} & c & \frac{e}{2} \\ \frac{d}{2} & \frac{e}{2} & f \end{bmatrix}.$$

Figure 4:
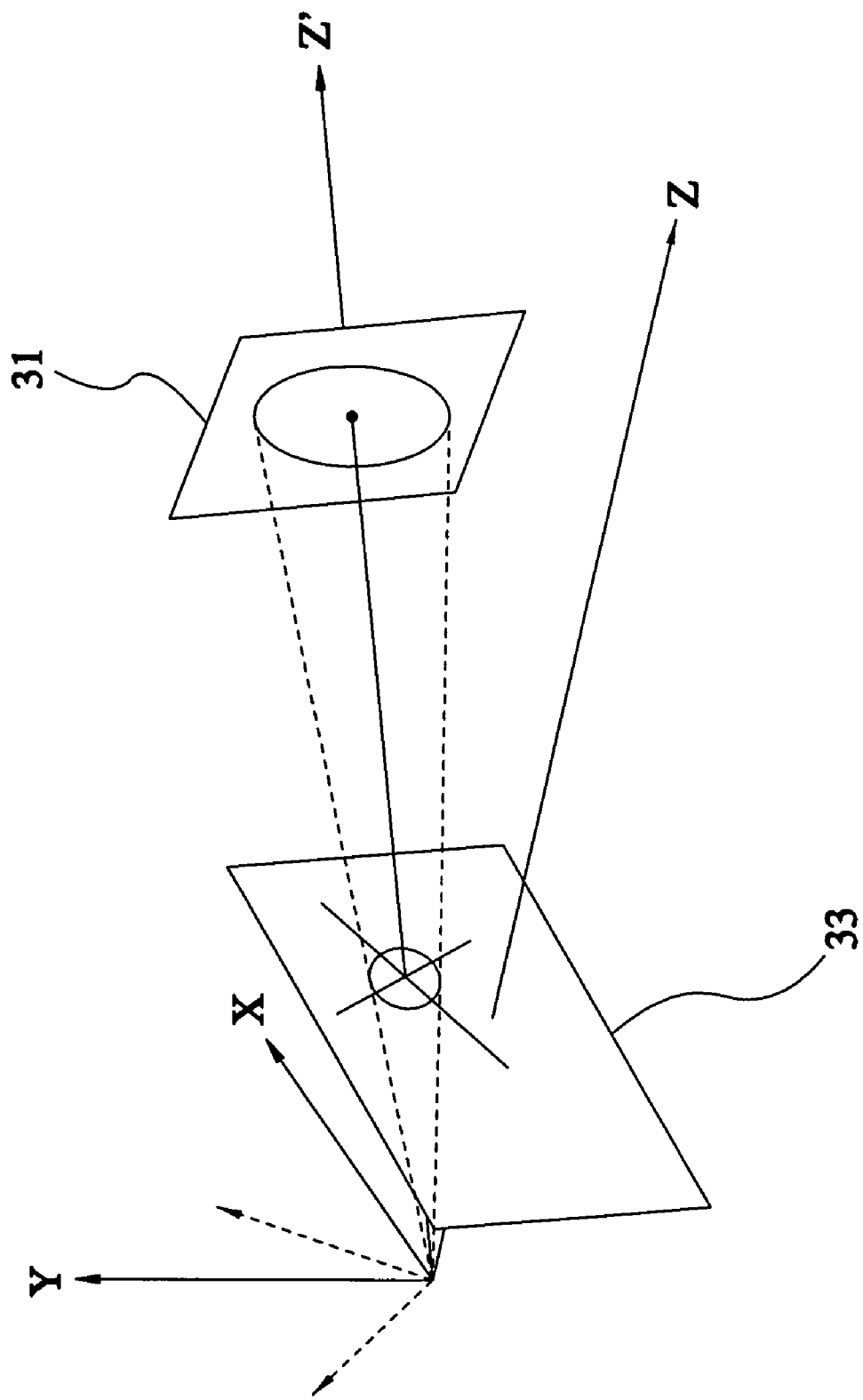
FIG. 4 illustrates an algorism in accordance with the first preferred embodiment of the present invention.

Next, the pose-from-ellipse algorism is taken through the model shown in FIG. 4. Suppose that there is a right circle in space, and the right circle is located on a right-circle plane 31 and is projected onto an image plane 33 to present an ellipse on the image plane 33. It is preset that an optical Z'-axis passes through a center of the ellipse and a center of the right circle. Such preset condition is provided in such a way that the quadratic matrix diagonalization of the ellipsoid equation is taken to call for a transformation matrix $R_1$ by the eigenvector, then to calculate a rotation angle and to enable a plane extending from a camera center of the image capture device 13 to be parallel to the right-circle plane 31 to call for a rotation matrix $R_2$, and finally to multiply the two matrixes to call for a right circle located on the image plane 33 and parallel to the right-circle plane 31.

The normal vector in the meantime is the parameter of the equation the plane, at which the right circle is located.

Diagonalize the transformation matrix $$C = \begin{bmatrix} a & \frac{b}{2} & \frac{d}{2} \\ \frac{b}{2} & c & \frac{e}{2} \\ \frac{d}{2} & \frac{e}{2} & f \end{bmatrix}$$

to call for the eigenvalue $\lambda_1 < \lambda_2 < \lambda_3$, whose corresponding eigenvector is $e_1$, $e_2$, $e_3$, such that a point P located on the image plane 33 passes through the transformation matrix to call for $P' = R_1^T P = [e_1|e_2|e_3]P$. Next, the rotation angle $\theta$ of an XZ-axis of the image plane 33 must be given, wherein the transformation matrix is defined as:

$$R_2 = \begin{bmatrix} \cos\theta & 0 & \sin\theta \\ 0 & 1 & 0 \\ -\sin\theta & 0 & \cos\theta \end{bmatrix}.$$

The coordinate system is a vector based on a center of the image capture device 13. If it is intended to call for the normal vector of the right-circle plane 31, the vector at a Z-axis must become minus. In this way, the normal vector of the right-circle plane 31 is defined as:

$$n = R_1 R_2 \begin{bmatrix} 0 \\ 0 \\ -1 \end{bmatrix} = R \begin{bmatrix} 0 \\ 0 \\ -1 \end{bmatrix} = \begin{bmatrix} -R_{13} \\ -R_{23} \\ -R_{33} \end{bmatrix}.$$

Figure 5:
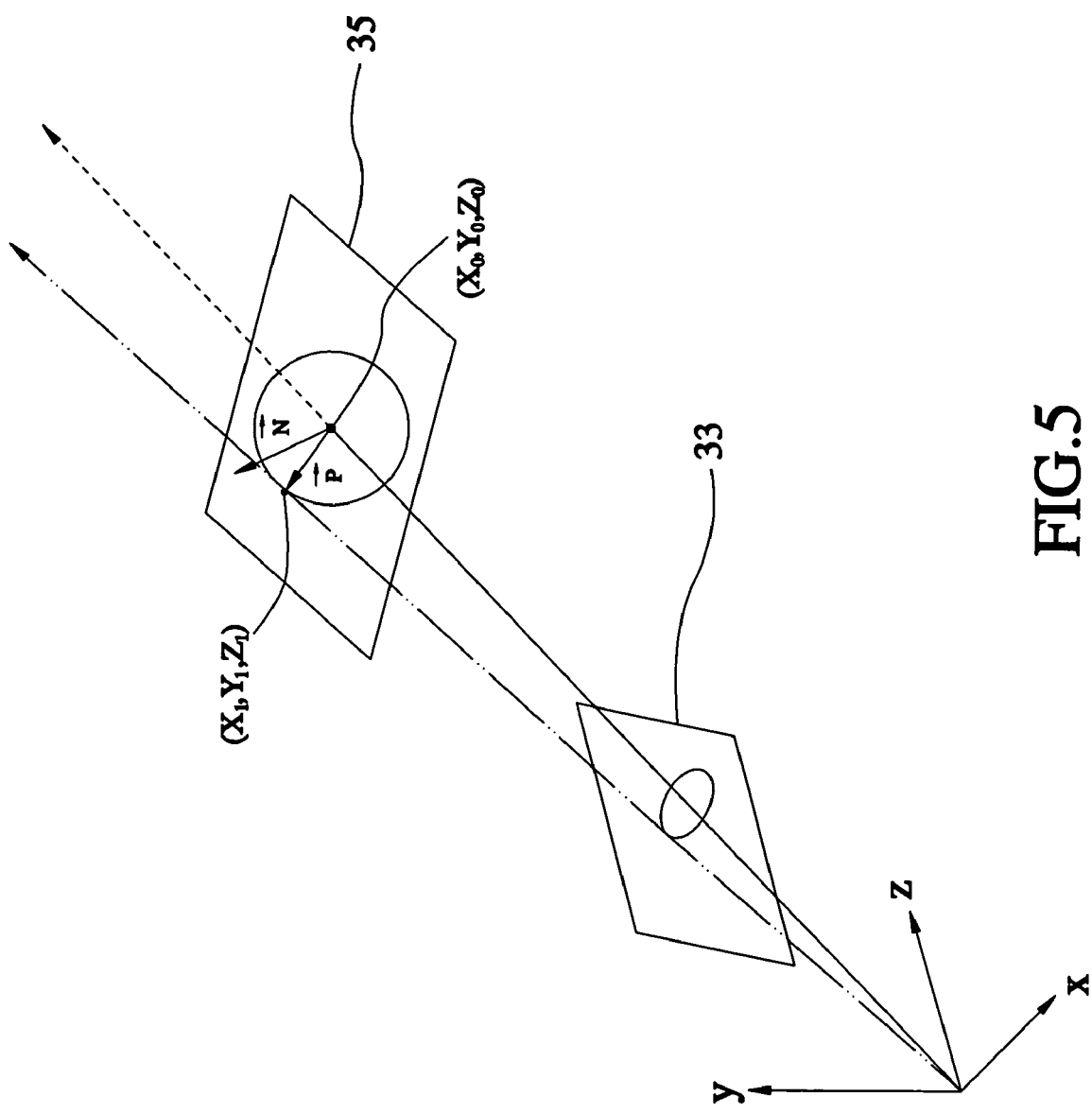
FIG. 5 is another algorism in accordance with the first preferred embodiment of the present invention.

Meanwhile, the liquid level has the even normal vector. After that, the equation of the liquid level must be calculated. Referring to FIG. 5, let $$\begin{cases} M_0 = [X_0 \ Y_0 \ Z_0] \\ M_1 = [X_1 \ Y_1 \ Z_1], \end{cases}$$

such that by the pose-from-ellipse algorism we have that the normal vectors $\vec{n}$ of the right circle in the space are the front three parameters of a plane equation defined as $aX+bY+cZ+d=0$, and then we can have the final parameter to complete the plane equation. The radius R of the transparent container 11 is given, $\|M_1 - M_0\| = R$, $\vec{p} = M_1 - M_0$, and the inner product of the vectors $\vec{p}$ and $\vec{n}$ is zero, i.e. $\vec{p} \cdot \vec{n} = 0$. Suppose the plane of the camera center of the image capture device 13 passes through the following two vectors of the image plane 33.

$$\begin{cases} (X_0, Y_0, Z_0) = \lambda_0(x_0, y_0) \\ (X_1, Y_1, Z_1) = \lambda_1(x_1, y_1) \end{cases}$$

Iterate and approximate correct $\lambda_0$ and $\lambda_1$ in the above vectors and then substitute the points $[X_0, Y_0, Z_0]$ or $[X_1, Y_1, Z_1]$ located on a liquid level 35 into the above-mentioned plane equation to have the final parameter "d". If it is intended to calculate the more correct and stabler plane equation, substitute multiple vectors located in the images and passing through the ellipse to call for the parameter "d". Because the substitution of each point calls for a liquid-level equation, it is necessary to call for the best liquid-level equation. After having the 3D coordinate points of the vectors locate on the right circle and extending from the edges of the ellipse, we can call for the best parameters by singular value decomposition (SVD), while the 3D coordinate points are more than three; to have the best liquid-level equation defined as follows:

$$A = \begin{bmatrix} X_1 & Y_1 & Z_1 & 1 \\ X_2 & Y_2 & Z_2 & 1 \\ \vdots & \vdots & \vdots & \vdots \\ X_n & Y_n & Z_n & 1 \end{bmatrix}$$

SVD(A) can call for the best liquid-level equation defined as: $\alpha X + \beta Y + \gamma Z + \delta = 0$ at the current height, wherein the parameters $\alpha$, $\beta$, $\gamma$ are the plane normal vectors.

In addition, in the above-mentioned steps, the 3D coordinates of the curve 15 between the current liquid level and the object 15 are what we need; each point on the curve in the image is a vector and after the vector extends for $\lambda_i$ times, substituting the vector into the aforesaid liquid-level equation must have zero as shown below.

$$\alpha\lambda_i x_i + \beta\lambda_i y_i + \gamma\lambda_i z_i + \delta 0$$

As per this equation, we have $$\lambda_i = \frac{\delta}{\alpha x_i + \beta y_i + \gamma z_i}$$

for the multiple $\lambda_i$. All of the points captured from the curves of the images can be called for their 3D coordinates in the space in accordance with the aforesaid equation.

The images are serially captured during the uprising of liquid level 17, such that aforesaid calculation can be done for each image to call for the 3D coordinates at different heights. After collecting those 3D coordinates, we can have the 3D model of the object 15.

The aforesaid approach affords creating the 3D model of one side of the object 15. If it is intended to create a 3D model of another side of the object 15, place the transparent container 11 on a turntable 21, wherein the rotary axis of the turntable 21 overlaps the center of the Z-axis of the transparent container 11, as shown in FIGS. 1-3; turn the turntable 21 to drive rotation of the object 15 at the same time to turn and enable another side of the object 15 to face the image capture device 13; and finally capture that side of the object 15 and then create the 3D model of same.

Figure 6:
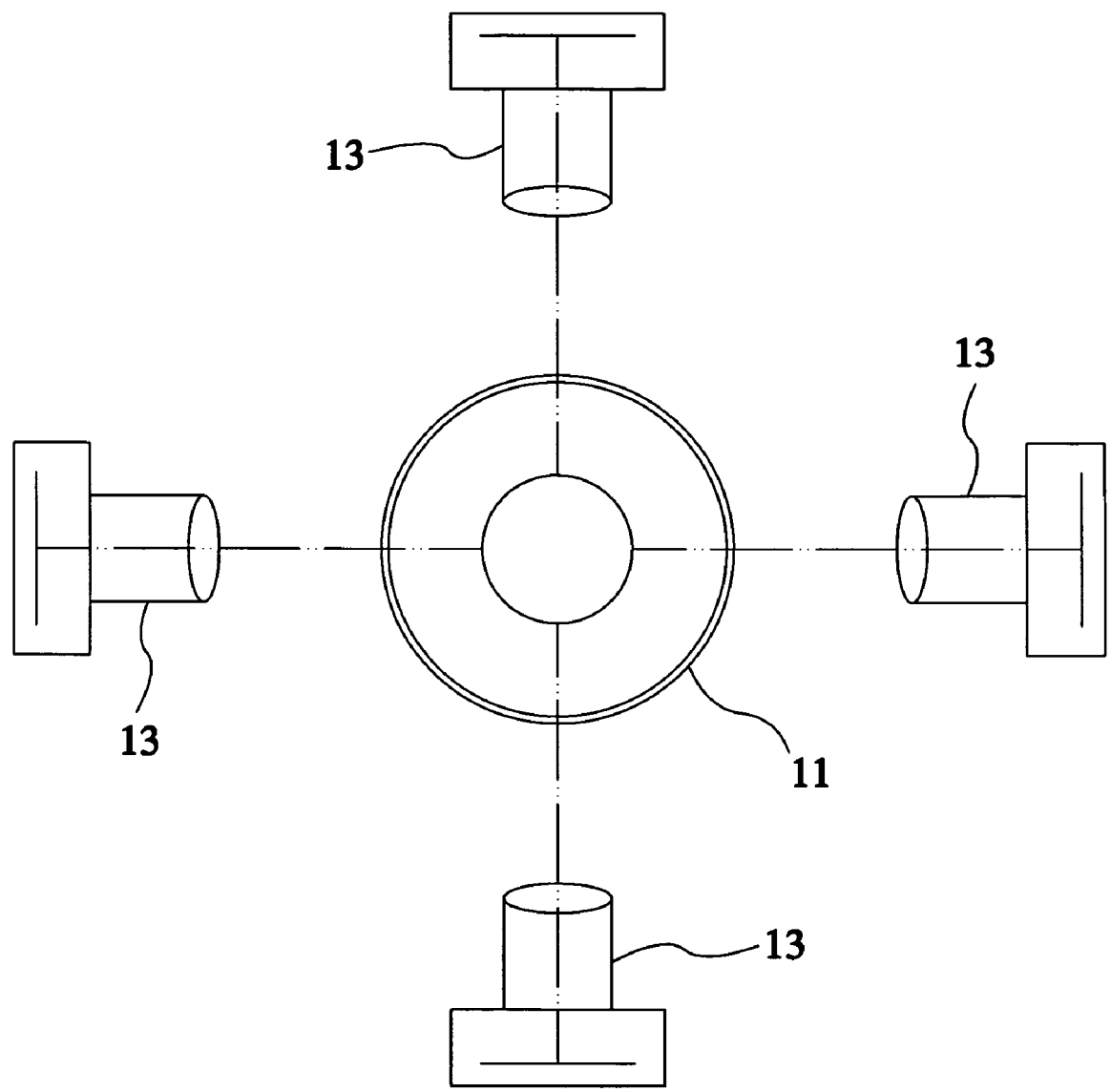
FIG. 6 is a schematic view of an allocation in accordance with a second preferred embodiment of the present invention

Referring to FIG. 6, a 3D model reconstruction acquisition based on images of incremental and decremental liquid levels in accordance with a second preferred embodiment of the present invention is different the first embodiment by that four images capture devices 13 are mounted at four sides of the transparent container 11 for simultaneous and synchronical image capture.

In conclusion, the present invention includes the following advantages.

1. The present invention is based on the incremental or decremental liquid level by means of the image processing and the plane equation to create the 3D model of the object.

2. The present invention can be done in the environment having water and thus be applied to various environments.

Although the present invention has been described with respect to specific preferred embodiments thereof, it is no way limited to the details of the illustrated structures but changes and modifications may be made within the scope of the appended claims.

What is claimed is:

1. A 3D model reconstruction acquisition comprising steps of:
   preparing a transparent container and at least one image capture device, wherein the image capture device is spaced from the transparent container, the transparent container has a cylindrical appearance and a geometric cross-section, and the transparent container receives an object and a liquid therein;
   keeping the liquid level rising or lowering to allow the liquid level to pass through the surface of the object and then keeping capturing a series of images of the liquid level by an image capture device every predetermined duration;
   computing a liquid-level equation for each of the images by using curves of the images between the object and the incremental or decremental liquid level confined by the transparent container;
   computing 3D coordinates of the curves in accordance with the liquid-level equation of each image; and
   collecting the 3D coordinates of the curves to create a 3D model of the object.

2. The 3D model reconstruction acquisition as defined in claim 1, wherein the transparent container has a circular cross-section.

3. The 3D model reconstruction acquisition as defined in claim 1, wherein the transparent container is placed on a turntable whose rotary center overlaps a Z-axis of the transparent container.

4. The 3D model reconstruction acquisition as defined in claim 1, wherein the at least one image capture device is four in number and the four image capture devices are located at four sides of the transparent container for simultaneous and synchronical image capture.

5. The 3D model reconstruction acquisition as defined in claim 1, wherein the image capture device is higher or lower than the object.

* * * * *